April 27, 1965   P. PASCHAKARNIS   3,180,167
MULTIPLE SPEED HUB WITH AUTOMATIC TRANSMISSION
Filed Feb. 4, 1963

INVENTOR
Peter Paschakarnis
By Richard Ernst
Agt

United States Patent Office 3,180,167
Patented Apr. 27, 1965

3,180,167
MULTIPLE SPEED HUB WITH AUTOMATIC TRANSMISSION
Peter Paschakarnis, Schweinfurt (Main), Germany, assignor to Fichtel & Sachs A.G., Schweinfurt (Main), Germany, a corporation of Germany
Filed Feb. 4, 1963, Ser. No. 255,833
Claims priority, application Germany, Feb. 7, 1962, F 35,956
11 Claims. (Cl. 74—336)

This invention relates to multiple speed hubs for bicycles and the like, and more particularly to a multiple speed hub with a built-in automatic transmission.

In known hubs of this type the transmission ratio of a multiple-speed transmission interposed between an input member and the hub shell is changed either in response to a change in the driving torque applied to the input member, or in response to the rotary speed of the hub shell and of the wheel attached to the hub shell. The input torque, particularly in pedal driven vehicles, may vary for reasons not related to conditions which require a change in transmission ratio, and automatic transmissions responsive to the wheel speed therefore operate more smoothly and with greater efficiency.

This invention is concerned with the latter type of automatic transmission. A centrifugal governor is employed in such hubs for actuating a change in transmission ratio at a predetermined wheel speed. It is necessary, however, to keep the dimensions of the hub shell as small as possible. The space available in a hub shell of conventional dimensions limits the size of the centrifugal weights which may be employed in the governor. The rotary speed of a bicycle wheel is never very great, and the power developed by the governor for actuating a speed change is therefore quite small. If the power available is not adequate, the automatic transmission does not operate reliably.

An object of this invention is the provision of a multiple speed hub of the type described in which ample power is available for actuating the speed change.

Another object of the invention is the provision of such a hub in which the speed governor controls the supply of power for shifting the transmission, but does not furnish such power.

More specifically, the invention aims at deriving the power for switching the transmission ratio from the main drive of the vehicle, and to employ a centrifugal governor for controlling the application of such power.

With these and other objects in view, the invention in one of its aspects provides a hub assembly in which a driver member and a hub shell are separately rotatable about the axis of the hub shaft, and are connected by an interposed multiple speed transmission which is shiftable between a plurality of transmission ratios. A speed shifting mechanism is connected to the transmission and capable of being engaged with the hub shell for shifting the transmission responsive to the rotation of the engaged hub shell. A centrifugal governor is connected to the hub shell and to the speed shifting mechanism so as to engage the speed shifting mechanism with the hub shell at a predetermined rotary speed of the latter.

Other features and many of the attendant advantages of this invention will become more fully apparent from the following detailed description of a preferred embodiment when considered in connection with the attached drawing in which.

Figure 1:
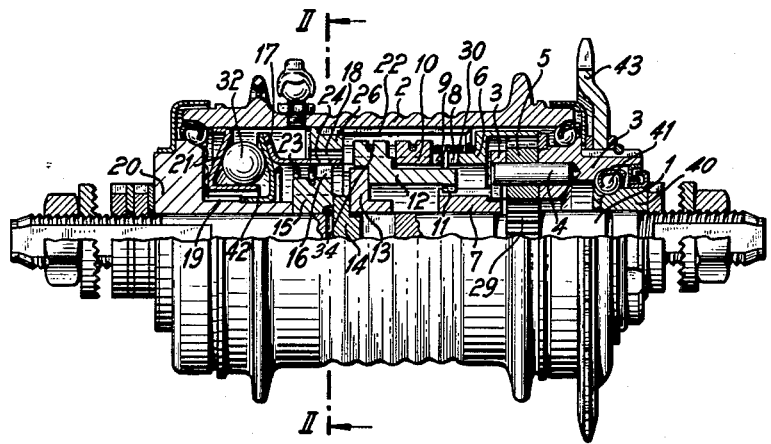
FIG. 1 is a side-elevational view of a multiple speed hub of the invention, a radial half of the hub being shown in section on its axis.

Referring now to the drawing, and initially to FIG. 1, there is seen the stationary shaft 1 of a bicycle hub equipped for mounting in the rear fork of a bicycle frame in the usual manner. An annular bearing member 40 is fixedly mounted on the shaft 1 in an axial end portion of the hub which will hereinafter be referred to as the drive end. An annular bearing member 20 is fastened on the shaft 1 in the other axial end portion of the hub which will be referred to as the speed governor end.

The drive mechanism of the illustrated hub consists of an annular driver member 3 supported on the shaft 1 by a ball bearing 41; a sprocket 43 fixed to the driver member for receiving a drive chain in the usual manner; and a coupling sleeve 7 fastened to the driver member 3 and extending therefrom toward the speed governor end of the hub. The several elements of the drive mechanism are jointly and coaxially rotatable on the shaft 1. The two axial ends of a hub shell 2 are respectively supported by ball bearings on the bearing member 20 and on the driver member 3 so that the hub mechanism is enclosed in the shell 2.

An integral portion of the driver member 3 constitutes the planet carrier of the two-speed planetary gearing with which the hub is equipped. Eccentric planet shafts 4 mounted on the driver member 3 rotatably carry respective planet gears 5 of which only one is seen in the drawing. The planet gears 5 simultaneously mesh with a stationary sun gear 29 on the shaft 1 and a ring gear 6.

In addition to the planetary gearing, the multiple speed transmission of the hub includes an axially slidable first annular pawl carrier 12 which is supported on the coupling sleeve 7 and on a ring 13. The ring 13 is freely rotatable and axially slidable on the shaft 1. Teeth 11 on the internal circumference of the pawl carrier 12 engage cooperating elongated teeth on the sleeve 7 to ensure joint rotation of the pawl carrier with the sleeve 7 in all axial positions of the pawl carrier. The pawl carrier 12 is equipped with circumferential pawls of a type shown in FIG. 2 and to be described in connection with that figure. The pawls are so positioned as not to be visible in FIG. 1, and are urged into engagement with a ratchet 22 on the internal wall of the hub shell 2 by means of an annular wire spring 34.

A second pawl carrier 10 is rotatable on a cylindrical surface of the pawl carrier 12, and its non-illustrated pawls also engage the ratchet 22. Claws 9 on the pawl carrier 10 and claws 8 on the ring gear 6 jointly form a claw coupling. In the position of the hub illustrated in FIG. 1, they are held out of engagement by a helical compression spring 30 which urges the pawl carrier 10 toward the speed governor end of the hub into abutting engagement with the first pawl carrier 12, and thereby also urges the first pawl carrier and the ring 13 toward the speed governor end.

In the illustrated position of the transmission, the torque applied to the driver member 3 by the sprocket 43 is transmitted by the coupling sleeve 7 to the pawl carrier 12, and by the pawls of the carrier to the hub shell which thus rotates at the same speed as the sprocket 43. The pawl carrier 10 freely rotates with the pawl carrier 12.

Figure 4:
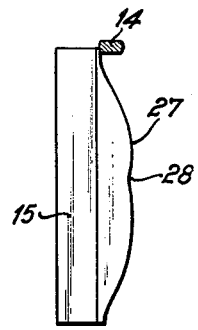
FIG. 4 illustrates a cam of the hub in a similarly developed view.

The speed shifting mechanism of the hub consists of a sliding block 14 secured against rotation in an axially elongated slot of the shaft 1, and of a rotatable annular cam 15. The ring 13 axially abuts against the sliding block 14 and presses it against the axial face of the cam 15 under the force of the spring 30. The cam 15 is seen in FIG. 4 in a developed view. It has an axially projecting lobe 27. The sloping flanks of the cam lobe form a shallow V-notch in which the sliding block 14 is received in the position of the apparatus illustrated in the drawing. The top of the lobe 27 is formed with a central shallow notch 28 of approximate V-shape.

Figure 2:
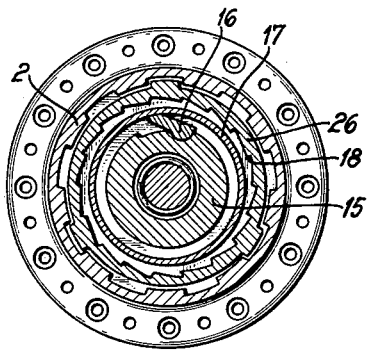
FIG. 2 shows the hub of FIG. 1 in radial section on the line II—II.
Figure 3:
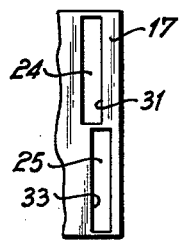
FIG. 3 is a fragmentary developed view of a blocking member of the hub of FIG. 1.

As best seen from FIG. 2, the cam 15 carries a pawl 16 which is urged radially outward by a non-illustrated spring, closely similar to the spring 34 for engagement with the ratchet teeth 18 of a ring 26 which is fastened to the hub shell 2. The pawl 16 and the ratchet teeth 18 form a free-wheeling coupling. In the position shown in FIG. 2 the coupling is held in a disengaged position by an interposed tubular blocking member 17. The portion of the blocking member 17 which controls the coupling engagement is shown in a developed view in FIG. 3. The member 17 has two identical circumferentially elongated rectangular slots 24, 25 which are axially offset by about one half of the axial width of each slot. Each slot extends circumferentially on the blocking member about an arc of almost 180°. The width of each slot is only slightly greater than the axial width of the pawl 16.

The blocking member 17 is an element of the speed governor mechanism which further includes a flange 42 of sheet metal which is axially movable on a cylindrical surface of the fixed bearing member 20, but secured against rotation by splines 19 on the bearing member engaging corresponding slots in the flange. The blocking member 17 is fixedly fastened to the movable flange.

The flange 42 and a sheet metal flange 21 form the walls of an annular chamber about the shaft 1 which tapers in a radially outward direction. The flange 21 is fixedly attached to the hub shell 2 and shaped to hold several relatively large bearing balls 32 circumferentially spaced about the shaft 1. The balls 32 of which only one is seen in FIG. 1 constitute the centrifugal weights of the speed governor mechanism. The axial position of the cam 15 is fixed. A compression spring 23 which abuts against the flange 42 and the cam 15 urges the walls of the annular chamber axially toward each other, and thus normally holds the balls 32 adjacent the shaft 1.

The speed governor mechanism actuates a change in transmission ratio by the speed shifting mechanism in the following manner:

As the rotary speed of the hub shell 2 increases, the balls 32 which rotate with the shell are urged radially outward by centrifugal forces, thereby spreading the walls 21, 42 of the chamber in which they are contained. Since the flange 21 is axially fixed, the flange 42 and the blocking member 17 are moved toward the drive end of the hub when the centrifugal forces become strong enough to overcome the spring 23. At a traveling speed of the vehicle which is quite precisely predictable from the known characteristics of the spring 23, the weight of the balls 32, and the dimensions of the governor mechanism, the longitudinal edge 31 of the slot 24 clears the pawl 16 so that the pawl is aligned with the slot 24, passes the slot and engages the ratchet teeth 18. Engagement of the coupling 16, 18 causes the cam 15 to rotate with the hub shell until the pawl 16 reaches the axial end wall of the slot 24 and is returned thereby to the inoperative position illustrated in FIG. 2. The pawl now is aligned with a portion of the blocking member 17 axially adjacent the edge 33 of the slot 25, but it cannot enter the slot until the blocking member 17 returns toward the speed governor end of the hub when the speed of the hub shell is reduced. Upon such a speed reduction, the spring 23 can overcome the centrifugal forces acting on the balls 32, the longitudinal edge 33 of the slot 25 clears the pawl 16, and the pawl can engage the ratchet teeth 18 for another rotary movement of the cam 15 through almost 180°.

As is evident from FIG. 4, each rotation of the cam 15 through approximately one half turns brings the sliding block 14 from one of the V-notches in the cam to the other. The precise positioning of the block 14 is left to the spring 30 which holds the block at the deepest point of each notch until the powerful torque transmitted from the hub shell to the cam by the coupling 16, 18 shifts the relative position of the cam 15 and of the block 14. The notches in the cam 15 together with the axially offset arrangement of the slots 24, 25 prevent accidental actuation of the speed shifting mechanism due to transient speed changes.

When the sliding block 14 moves from the position illustrated in FIG. 4 into the notch 28, it shifts the ring 13 from the position shown in FIG. 1 toward the drive end of the hub against the restraint of the spring 30. The claws 8, 9 are engaged, and the hub shell 2 is driven by a transmission train which includes the driver member 3, the planet gears 5, the ring gear 6, the claw coupling 8, 9, and the planet carrier 10. Since the ring gear rotates faster about the axis of the shaft 1 than the driver member or planet carrier 3, the hub shell is driven by the non-illustrated pawls of the second pawl carrier 10 at a speed which is higher than that of the first pawl carrier 12. The pawls of the latter merely slide over the teeth of the faster moving ratchet 22. At a relatively high speed of rotation of the hub shell 2, the effective transmission ratio of the planetary gearing is thus increased.

Return of the sliding block 14 into the position seen in FIG. 1 upon slowing down of the hub shell causes downshifting to the original speed in a manner not requiring further description. Because of the axially spaced arrangement of the slots 24, 25, shifting from the higher transmission ratio to the lower ratio occurs at a lower rotary speed of the hub shell than shifting from low gear into high gear.

The difference between the two speeds at which the transmission is shifted during acceleration and deceleration of the hub shell rotation is determined by the axial spacing of the slots 24, 25, and is substantially fixed. The speed level at which the transmission is being shifted may be varied by substituting a spring of different characteristics for the spring 23, or by varying the tension of the spring 23, as by interposing a washer between the spring and one of its abutments.

While the invention has been illustrated with reference to a two-speed planetary transmission, it will be apparent to those skilled in the art that it is not limited to any specific number of transmission ratios in the multiple speed transmission, nor to the use of planetary gearing. Many other modifications and alterations of the specific embodiment chosen for the purpose of the disclosure will readily suggest themselves. It will, therefore, be understood that the invention is to be construed broadly, and is to be limited only by the scope of the appended claims.

What is claimed is:

1. In a multiple speed hub, in combination:
   (a) shaft means having an axis;
   (b) hub shell means mounted on said shaft means for rotation about said axis;
   (c) driver means mounted on said shaft means for rotation about said axis;
   (d) multiple speed transmission means movable between a first position in which said transmission means has a first transmission ratio and a second position in which said transmission means has a second transmission ratio, said transmission means being interposed between said driver means and said hub shell means for alternatively rotating said hub shell means at said first and second ratios responsive to rotation of said driver means;
   (e) speed shifting means operatively connected to said transmission means and selectively engageable with said hub shell means for transmitting the movement of said hub shell means to said transmission means for thereby moving said transmission means between said positions thereof responsive to rotation of the engaged hub shell means; and (f) centrifugal governor means connected to said hub shell means for rotation therewith and to said speed shifting means for engaging said speed shifting means with said hub shell means at a predetermined rotary speed of said hub shell means, said hub shell means enclosing said transmission means, said speed shifting means, and said centrifugal governor means.

2. In a hub as set forth in claim 1, coupling means interposed between said speed shifting means and said hub shell means, said coupling means being actuable for selectively engaging said speed shifting means with said hub shell means, said coupling means engaging said governor means for actuation thereby.

3. In a multiple speed hub, in combination:
(a) shaft means having an axis;
(b) hub shell means mounted on said shaft means for rotation about said axis;
(c) driver means mounted on said shaft means for rotation about said axis;
(d) multiple speed transmission means shiftable between a first transmission ratio and a second transmission ratio and interposed between said driver means and said hub shell means for rotating said hub shell means responsive to rotation of said driver means;
(e) speed shifting means operatively connected to said transmission means and selectively engageable with said hub shell means for shifting said transmission means between said transmission ratios thereof responsive to rotation of the engaged hub shell means;
(f) coupling means interposed between said speed shifting means and said hub shell means, said coupling means being actuable for selectively engaging said speed shifting means with said hub shell means,
  (1) said coupling means having two operating portions respectively secured to said speed shifting means and to said hub shell means, one of said portions including ratchet means and the other portion including pawl means engageable with said ratchet means; and
(g) centrifugal governor means connected with said hub shell means and said coupling means for actuating said coupling means at a predetermined rotary speed of said hub shell means.

4. In a hub as set forth in claim 3, said governor means including a blocking member interposed between said pawl means and said ratchet means, said blocking member being formed with an opening therein, said governor means further comprising means for aligning said opening with said pawl means at said predetermined rotary speed for passage of said pawl means through said opening into engagement with said ratchet means.

5. In a hub as set forth in claim 3, said governor means including a blocking member of tubular shape about said axis and axially movable responsive to the rotary speed of said hub shell means, said blocking member being interposed between said pawl means and said ratchet means and formed with two axially and circumferentially spaced openings therein, said governor means further comprising means for aligning one of said openings with said pawl means at said predetermined speed when the speed of said hub shell means increases, and for aligning the other one of said openings with said pawl means at another speed of said hub shell means when the speed of said hub shell means decreases.

6. In a hub as set forth in claim 5, said pawl means and said ratchet means being rotatable relative to each other about said axis, and said openings each extending circumferentially about an arc of not substantially less than 180°.

7. In a multiple speed hub, in combination:
(a) shaft means having an axis;
(b) hub shell means mounted on said shaft means for rotation about said axis;
(c) driver means mounted on said shaft means for rotation about said axis;
(d) multiple speed transmission means shiftable between a first transmission ratio and a second transmission ratio and interposed between said driver means and said hub shell means for rotating said hub shell means responsive to rotation of said driver means;
(e) speed shifting means operatively connected to said transmission means and selectively engageable with said hub shell means for shifting said transmission means between said transmission ratios thereof responsive to rotation of the engaged hub shell means; and
(f) centrifugal governor means connected to said hub shell means and said speed shifting means for engaging said speed shifting means with said hub shell means at a predetermined rotary speed of said hub shell means, said centrifugal governor means including
  (1) two annular walls extending between said hub shell means and said shaft means, said walls jointly defining an annular chamber tapering in a radially outward direction,
  (2) centrifugal weight means radially movable in said chamber, one of said walls being axially movable and operatively connected to said speed shifting means for engaging the same with said hub shell means during axial movement of said movable wall, and
  (3) yieldably resilient means axially urging said movable wall into abutting engagement with said centrifugal weight means in said chamber.

8. In a hub as set forth in claim 7, the other one of said walls being connected to said hub shell means and to said centrifugal weight means for joint rotation of said weight means with said hub shell means.

9. In a hub as set forth in claim 7, said centrifugal weight means including a plurality of spherical members circumferentially spaced about said axis in said chamber.

10. In a multiple speed hub, in combination:
(a) shaft means having an axis;
(b) hub shell means mounted on said shaft means for rotation about said axis;
(c) driver means mounted on said shaft means for rotation about said axis;
(d) multiple speed transmission means shiftable between a first transmission ratio and a second transmission ratio and interposed between said driver means and said hub shell means for rotating said hub shell means responsive to rotation of said driver means;
(e) speed shifting means operatively connected to said transmission means and selectively engageable with said hub shell means for shifting said transmission means between said transmission ratios thereof responsive to rotation of the engaged hub shell means; and
(f) centrifugal governor means connected to said hub shell means and to said speed shifting means for engaging said speed shifting means with said hub shell means at a predetermined rotary speed of said hub shell means,
  (1) said multiple speed transmission means including a transmission member axially movable for shifting said transmission means between said transmission ratios,
  (2) said speed shifting means including a rotatable shifting member engageable by said governor means with said hub shell means for joint rotation, and motion transmitting means interposed between said rotatable member and said axially movable member for axially moving said transmission member when said shifting member rotates.

11. In a multiple speed hub, in combination:
(a) shaft means having an axis;

(b) hub shell means mounted on said shaft means for rotation about said axis;

(c) driver means mounted on said shaft means for rotation about said axis;

(d) multiple speed transmission means shiftable between a first transmission ratio and a second transmission ratio and interposed between said driver means and said hub shell means for rotating said hub shell means responsive to rotation of said driver means;

(e) speed shifting means operatively connected to said transmission means and selectively engageable with said hub shell means for shifting said transmission means between said transmission ratios thereof responsive to rotation of the engaged hub shell means; and (f) centrifugal governor means connected to said hub shell means and to said speed shifting means for engaging said speed shifting means with said hub shell means at a first predetermined rotary speed of said hub shell means when the rotary speed of said hub shell means increases, and for engaging said speed shifting means with said hub shell means at a second predetermined rotary speed of said hub shell means, different from said first speed when the rotary speed of said hub shell means decreases.

References Cited by the Examiner
UNITED STATES PATENTS
2,649,817   8/53   La Voque _____ 74—752

DON A. WAITE, *Primary Examiner.*